United States Patent [19]

Bechade

[11] Patent Number: 4,982,357

[45] Date of Patent: Jan. 1, 1991

[54] PLURAL DUMMY SELECT CHAIN LOGIC SYNTHESIS NETWORK

[75] Inventor: Roland A. Bechade, South Burlington, Vt.

[73] Assignee: International Business Machines Corporation, Armonk, N.Y.

[21] Appl. No.: 344,566

[22] Filed: Apr. 28, 1989

[51] Int. Cl.$^5$ .............................................. G06F 7/50
[52] U.S. Cl. .................................................. 364/788
[58] Field of Search .......................... 364/784, 785–788

[56] References Cited

U.S. PATENT DOCUMENTS

| | | | |
|---|---|---|---|
| 3,100,835 | 8/1963 | Bedrij | 364/788 |
| 3,316,393 | 4/1967 | Ruthazer | 364/788 |
| 3,743,824 | 7/1973 | Smith | 364/788 |
| 4,559,609 | 12/1985 | Robinson, Jr. et al. | 364/784 |
| 4,573,137 | 2/1986 | Ohhashi | 364/788 |
| 4,651,296 | 3/1987 | Koike | 364/786 |
| 4,682,303 | 7/1987 | Uya | 364/788 |
| 4,704,701 | 11/1987 | Mazin et al. | 364/788 |
| 4,707,800 | 11/1987 | Montrone et al. | 364/788 |
| 4,763,295 | 8/1988 | Yamada et al. | 364/786 |
| 4,764,888 | 8/1988 | Holden et al. | 364/788 |
| 4,766,565 | 8/1988 | Béchade et al. | 364/786 |
| 4,817,031 | 3/1989 | Tokumaru | 364/787 |
| 4,831,578 | 5/1989 | Bui | 364/784 |
| 4,866,658 | 9/1989 | Mazin et al. | 364/784 |

OTHER PUBLICATIONS

Freeman, "Checked Carry Select Adder", *IBM Technical Disclosure Bulletin*, vol. 16, #6, pp. 1504–1505, Nov. 1970.

Bedrit, "Adder Circuit", *IBM Technical Disclosure Bulletin*, vol. 4, #3, pp. 36–39, Aug. 1961.

Primary Examiner—Dale M. Shaw
Attorney, Agent, or Firm—Mark F. Chadurjian

[57] ABSTRACT

A logic synthesis network for efficiently combining respective bit pairs of first and second operands to produce respective sum bits and a carry bit associated with the most significant sum bit. A dummy generator receives the respective bit pairs and generates first and second dummy sum signals, and first and second pairs of dummy carry signals. A first dummy selector chain selects the appropriate dummy sum and carry signals of all the bits other than the least significant bit, as a function of the state of the first pair of dummy carry signals generated for the least significant bit pair. A second dummy select chain selects the appropriate dummy sum and carry signals for all the bit pairs other than the least significant bit pair, as a function of the state of the second pair of dummy carry signals generated for the least significant bit pair. Sum generators associated with each bit choose between the selected dummy sum signals from the first and second dummy select chains in accordance with the state of the carry-in signal associated with the least significant bit pair. Carry generators associated with each bit pair choose between the first and second pairs of dummy carry signals at the ends of the first and second dummy select chains, again in accordance with the state of the carry-in signal associated with the least significant bit pair.

14 Claims, 5 Drawing Sheets

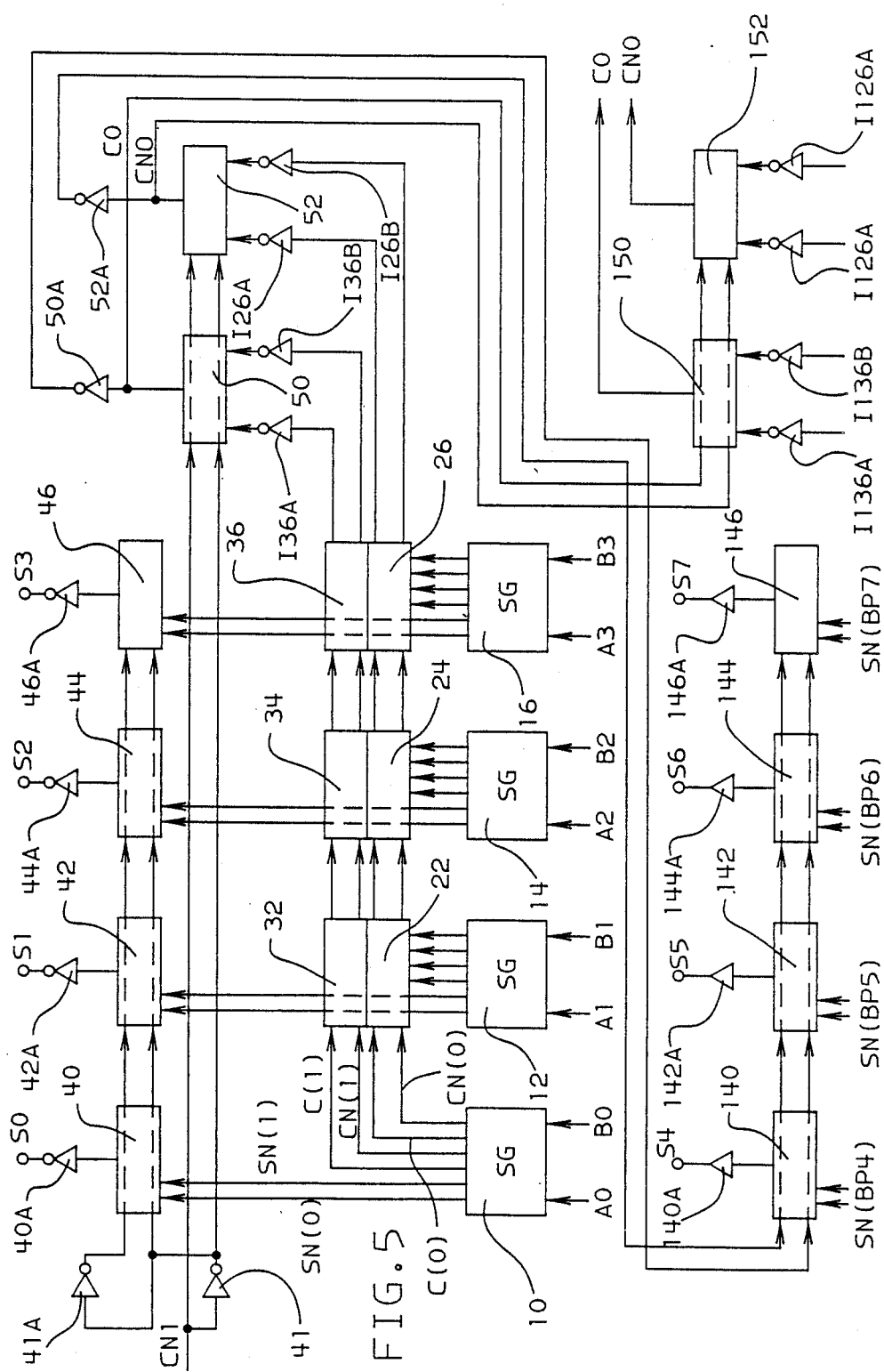

PLURAL DUMMY SELECT CHAIN LOGIC SYNTHESIS NETWORK

FIELD OF THE INVENTION

The invention relates generally to the field of logic synthesis networks, and more specifically to the design of combanitoral networks such as adders and the like.

BACKGROUND ART

As computer programming has become more sophisticated, greater performance demands are placed upon basic logic combinatoral networks such as adders, multipliers, and the like. In general, these demands have been met by utilizing state-of-the-art transistor processing techniques to reduce switching delays. However, as the number of bits to be logically synthesized increases, this solution becomes inadequate. Accordingly, renewed emphasis has been placed upon the design of these basic logic networks.

One design factor that has received particular attention is the reduction of delays caused by wait states that naturally occur within the logic synthesis algorithm. For example, in a conventional adder, the final sum bit for a given pair of bits to be added is generated by combining the preliminary sum bit with the carry bit from the preceding bit pair. If a designer were to optimize the speed of the portion of the logic that generates the preliminary sum bit, the effort would be wasted if the logic has to wait for generation of the carry bit in order to generate the final sum.

Accordingly, several designs have been proposed in which the logic does not have to wait for the generation of the carry bit for each bit pair in order to generate the final sums. In U.S. Pat. No. 4,573,137, entitled "Adder Circuit," issued Feb. 25, 1986 to Ohhashi and assigned to Toshiba, two dummy sum terms are generated for each pair of bits to be added. The first dummy sum is generated assuming a carry in of 0, and the second dummy sum is generated assuming a carry in of 1. The actual carry-in signal is then used to select between the two dummy sums. Thus, rather than waiting to generate the sum terms until the carry is received, in this patent dummy sums are generated and selected by the carry-in from the preceding bit pair. This reduces the above-discussed wait time.

Another way of reducing the delays produced by wait states is disclosed in U.S. Pat. No. 4,707,800, entitled "Adder/Subtractor For Variable Length Numbers," issued Nov. 17, 1987 to Montrone et al and assigned to Raytheon Co. In this patent, the carry-in from one pair of bits is used to select the carrys for a plurality of other pairs of bits. For the least significan bit pair, the carry-out is generated. For the next most significant bit pair, a first dummy carry-out is generated assuming a carry-in of 1, and a second dummy carry-out is generated assuming a carry-in of 0. These dummy carry signals are then fed to the dummy carry generators for the next most significant pair of bits to be added, and so on, such that all the dummy carrys are predicated upon the state of the carry-out from the least significant bit pair. The actual carry-out from the least significant bit pair is then used to select the correct dummy carry-out for each bit pair. The selected dummy carry is then combined with the preliminary sum term for each bit pair to generate the final sum term for each bit pair.

Other techniques for reducing wait states are shown in U.S. Pat. No. 4,763,295, entitled "Carry Circuit Suitable For A High-Speed Arithemtic Operation," issued Aug. 9, 1988 to Yamada et al and assigned to NEC Co. (use of selection to increase efficiency in a carry look ahead scheme), and in an article by Freemen, entitled "Checked Carry Select Adder," IBM Technical Disclosure Bulletin, Vol. 13, No. 6, Nov. 1970 pp. 1504-5 (actual carry-in for first bit used to select between dummy sums generated for subsequent bits).

Although the foregoing designs do increase processing speeds by minimizing wait states, they still do not provide optimum results by minimizing all the wait states that naturally occur. At the same time, most of the prior art techniques use AND/OR circuitry to generate the sum and carry terms, rather than NAND/NOR techniques that minimize device counts and eliminate delays by deleting inverter stages (see U.S. Pat. No. 4,766,565 for an example of ALU design utilizing NAND/NOR techniques).

Accordingly, a need has arisen in the art for a logic synthesis network that further minimizes all wait states inherent in generating sum and carry bits, while utilizing circuit techniques that minimizes device counts and maximize signal generation speeds.

SUMMARY OF THE INVENTION

The above and other needs in the art are realized by a logic synthesis network that utilizes plural dummy select chains. The network comprises a first means for generating for respective bit pairs a first group of dummy sum and dummy carry signals assuming a carry-in from a preceding bit pair is low, and a second group of dummy sum and dummy carry signals assuming a carry in from a preceding bit pair is high; a first selector chain for choosing between the dummy sum and carry signals for all the bit pairs other than the least significant bit pair, as a function of the carry signal from the least significant bit pair being of a first logic state; a second selector chain for choosing between the dummy sum and carry signals for all the bit pairs other than the least significant bit pair, as a function of the carry signal from the least significant bit pair being of a second logic state; a sum generator that selects the real sum for each of the respective bit pairs by choosing between the respective first and second dummy sum signals, the sum generator receiving the carry-in signal to the least significant bit pair as a control input; and a carry generator for selecting the real carry out for the most significant bit pair by selecting between the outputs of the final members of the first and second dummy select chains, said carry generator receiving the carry-in to the least significant bit pair as a control input.

BRIEF DESCRIPTION OF THE DRAWING

The foregoing and other aspects of the invention will become readily apparent upon a review of the description of the preferred embodiment of the invention as rendered below. In the description to follow, reference will be made to the accompanying Drawing, in which:

FIG. 5 is a block diagram of a second embodiment of the invention.

DESCRIPTION OF THE BEST MODE FOR CARRYING OUT THE INVENTION

The various structures, operations, and features of the invention will now be described with reference to the circuit block diagram of FIG. 1. In the preferred mode of the invention, the specific logical function to be carried out is addition. However, it is to be understood that the invention as described herein can be utilized to provide any sort of logical function (e.g., multiplication) that includes some summation of terms.

Figure 1:
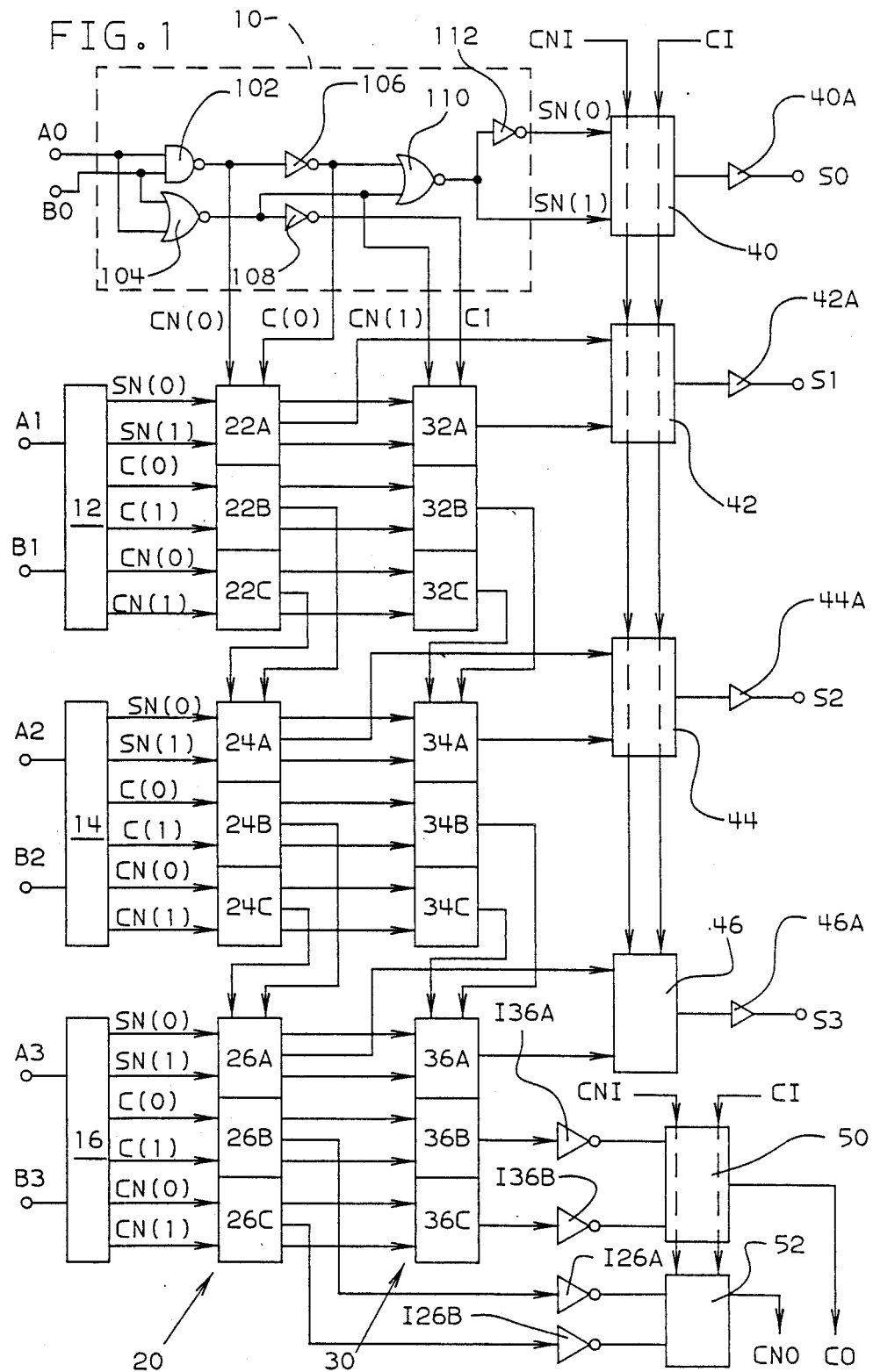
FIG. 1 is a block diagram of a first embodiment of the invention.

In the invention as shown in FIG. 1, two four bit words A and B are to be added. The bits of A and B having the same position (or "significance") are referred to hereinafter as respective "bit pairs." Thus, bits A0 and B0 are a first bit pair, A1 and B1 are a second, A2 and B2 are a third, and A3 and B3 are a fourth. The pairs are in ascending order of significance, such that the A0–B0 pair is the least significant (i.e. 1's bit), A1–B1 the next most significant (10's bit), etc. The respective bit pairs form the operand inputs to respective signal generators 10, 12, 14, and 16. The purpose of these signal generators is to generate a plurality of dummy sum and carry signals for each bit pair. Their construction and operation will be described in more detail with reference to signal generator 10, which shows the specific circuitry for the signal generator blocks.

Each signal generator comprises a NAND gate 102 that receives the input bit pair as inputs, a NOR gate 104 that receives the input bit pair as inputs, an inverter 106 that receives the output of NAND 102, an inverter 108 that receives the output of NOR 104, a NOR gate 110 that receives the output of inverter 106 and NOR 104 as inputs, and an inverter 112 that receives the output of NOR 110. The output of each of the circuit elements described above provides one of the six output signals from the signal generator.

Table 1 shows the respective sum and carry-out bits generated by adding A and B of different logic states, with respective carry-in signals of 0 and 1. Table 1 also shows the outputs of NAND 102 and NOR 104 corresponding to respective combinations of A and B signals:

TABLE 1

| A | B | Carry-In | Sum | Carry-Out | NAND 102 | NOR 104 | NOR 110 |
|---|---|---|---|---|---|---|---|
| 0 | 0 | 0 | 0 | 0 | 1 | 1 | 0 |
| 0 | 1 | 0 | 1 | 0 | 1 | 0 | 1 |
| 1 | 0 | 0 | 1 | 0 | 1 | 0 | 1 |
| 1 | 1 | 0 | 0 | 1 | 0 | 0 | 0 |
| 0 | 0 | 1 | 1 | 0 | 1 | 1 | 0 |
| 0 | 1 | 1 | 0 | 1 | 1 | 0 | 1 |
| 1 | 0 | 1 | 0 | 1 | 1 | 0 | 1 |
| 1 | 1 | 1 | 1 | 1 | 0 | 0 | 0 |

Note that the NAND of A and B (NAND 102) provides the inverse of the carry out for a carry-in of 0, and that the NOR or A and B (NOR 104) is the inverse of the carry-out for a carry-in of 1. Thus the inverter 106 provides the true carry out for a carry-in of 0, and the inverter 108 provides the true carry-out for a carry-in of 1.

Further, note that the NOR of the inverse of A and NOR 104 (NOR 110) is the inverse of the sum of A and B for a carry-in of 1. Thus, inverter 112 outputs the inverse of the sum of A and B for a carry-in of 0.

Table 2 summarizes the outputs of the functional blocks within the signal generator, and lists the names of the outputs.

TABLE 2

| Circuit Block | Output | Output Name |
|---|---|---|
| NAND 102 | Inverted carry out, carry-in of 0 | CN(0) |
| INV 106 | True carry out, carry-in of 0 | C(0) |
| NOR 104 | Inverted carry out, carry-in of 1 | CN(1) |
| INV 108 | True carry out, carry-in of 1 | C(1) |
| NOR 110 | Inverted sum out, carry-in of 1 | SN(1) |
| INV 112 | Inverted sum out, carry-in of 0 | SN(0) |

The above signals generated by the signal generators are "dummy" signals. In other words, they are not used directly as the carry and sum signals, because their logic levels depend upon the logic state of the carry-in signal for the respective bit pairs. In the invention, further logic is provided to select the ultimate sum and carry signals from among the dummy signals generated by the signal generators, utilizing the state of the carryin signal for the least significant bit pair.

The dummy sum and carry signals discussed above are generated by each signal generator for the respective bit pairs at its input. For example, signal generator 12 produces the six output signals shown for the A1, B1 pair, etc. In the case of the signal generator 10 coupled to the least significant bit pair A0, B0, the dummy sum signals SN(1), SN(0) are coupled directly to a sum generator 40. The function of the sum generator will be described below. The CN(0) and C(0) dummy carry signals from signal generator 10 are sent to first dummy sum and carry select chain 20, and the CN(1) and C(1) signals from signal generator 10 are sent to a second dummy sum and carry select chain 30. Dummy sum and carry select chains 20 and 30 (hereinafter referred to as "dummy select chains") will be described in more detail below.

For the remaining sum generators 12, 14, and 16, all of the dummy output signals are sent to the first and second dummy select chains.

Figure 2:
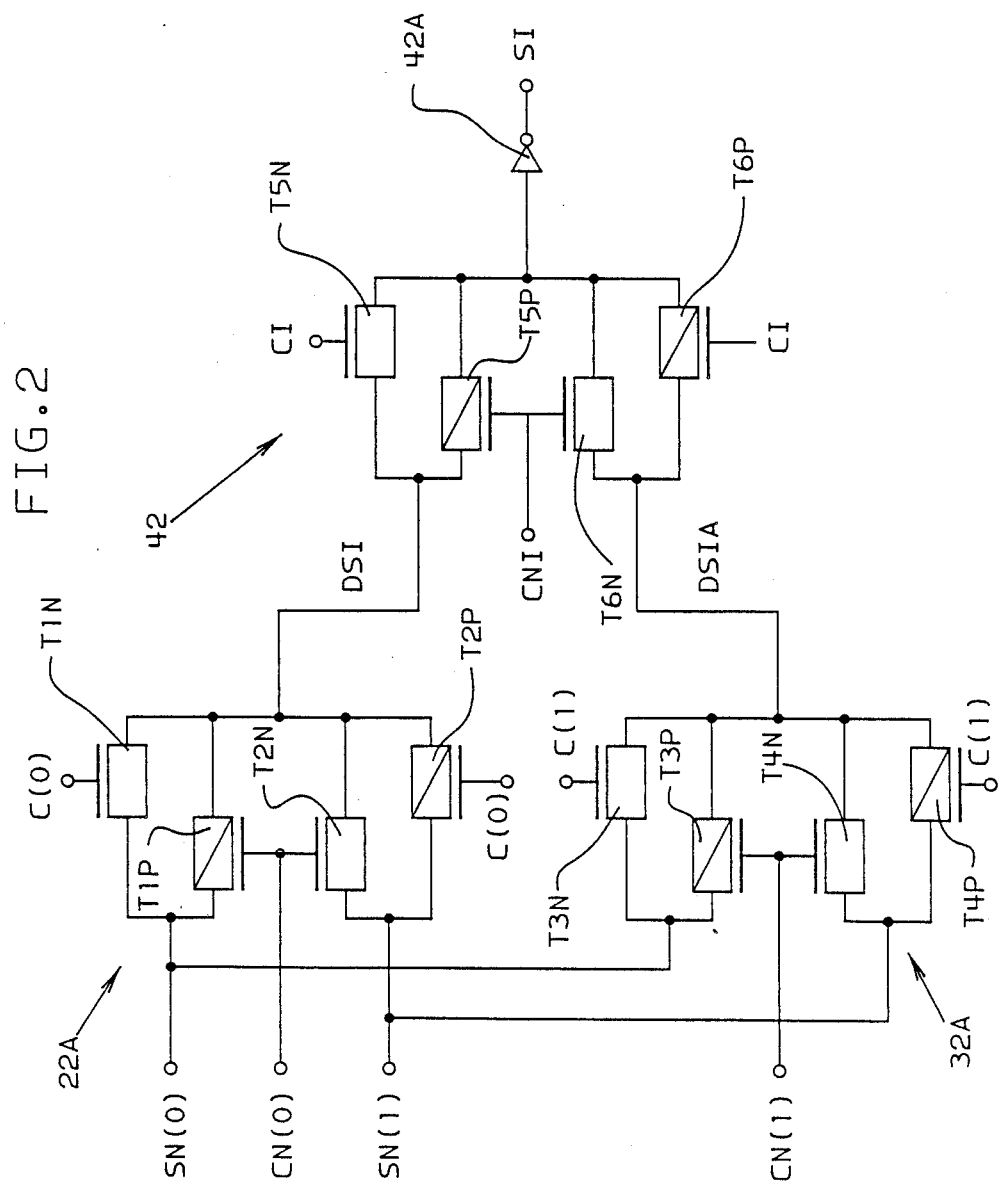
FIG. 2 is a schematic circuit diagram of circuit blocks 22A, 32A, and 42 of FIG. 1.

FIG. 2 is a detailed block diagram of circuit blocks 22A, 32A, and 42 of FIG. 1. The circuit block 22A is the first sum selector of the first dummy select chain 20, and the circuit block 32A is the first sum selector of the second dummy select chain 30. The circuit block 42 is the sum generator for the signal generator 12. The purpose of the sum selectors is to pass the appropriate dummy sum to the sum generator, as a function of the dummy carry-out signals from the first signal generator 10.

Each of the circuit blocks comprise two pairs of parallel N and P field effect transistors. The gate electrodes of the devices in each pair are coupled to opposite carry inputs. In block 22A, the gate electrode of the first N device T1N is coupled to the carry signal C(0), and the gate electrode of the first P device T1P is coupled to carry signal CN(0). Both devices receive dummy sum SN(0). Likewise, the gate of T2N is coupled to CN(0), and the gate of device T2P is coupled to C(0). Both devices receive dummy sum SN(1).

The parallel N and P devices are utilized as transmission gates. That is, when the gate electrode of the N device is at a high voltage and the gate electrode of the P device is at a low voltage, whatever voltage is present at the respective source/drain electrodes will be passed (or transmitted) through the transistors. N and P devices are used to avoid losing a threshold drop during transmission through the transistor. That is, a high voltage will not lose a threshold drop when passed through a P device, and a low voltage will not lose a threshold drop when passed through an N device. This feature is important since (as will be described in more detail below) the dummy signals are passed by multiple transmission gates. If a threshold loss was allowed to occur during each passage, the signal level through the logic would substantially degrade.

In operation, assume for the moment that dummy carry C(0) is high. This means that dummy carry CN(0) is low. Thus, devices T1N and T1P will be on, and devices T2N and T2P will be off. Dummy sum signal SN(0) will be passed via devices T1N and T1P, while dummy sum signal SN(1) will be isolated from the output by devices T2N and T2P. In this fashion, the appropriate dummy sum signal is passed to the data selector. Similarly, devices T3N, T3P, T4N, T4P will propagate the appropriate dummy sum signal depending on the state of dummy carry signal C(1) and its complement CN(1).

As a consequence of the above operations, sum selector 22A passes dummy sum signal SN(0) or SN(1) to sum generator input DSI, and sum selector 32A passes dummy sum signal SN(0) or SN(1) to sum generator input DSIA. The sum generator 42 operates in a manner similar to the sum selectors, except it receives the actual carry inputs CI, CNI that are input to the least significant bit position (i.e., bit pair A0, B0). Thus, sum generator 42 receives at its inputs dummy sum inputs for assumed carries of either polarity, and it chooses between these two inputs in accordance with the polarity of the actual carry-in signal.

This operation can be described as follows. Assume the actual carry-in CI is low (such that CNI is high). Devices T5N, T5P will be off, such that dummy sum SN(0) is isolated from the output. Devices T6N, T6P will be high, passing dummy signal SN(1). Thus, the sum generator 42 has selected the appropriate dummy signal SN(1) for the actual carry-in signal CI, CNI. This signal is then buffered via inverter 42A, such that the true sum S1 is provided at the inverter output.

The above-described operation of first sum selector 22A of the first dummy select chain 20 is also carried out by sum selectors 24A and 26A, for the respective bit pairs input to signal generators 14 and 16, respectively. Similarly, the operation of first sum selector 32A of the second dummy select chain 30 is replicated by sum selectors 34A and 36A for the respective bit pairs. Note that each of the sum generators 40, 42, 44, and 46 receive the same original CI, CNI carry signals to the least significant pair, and they operate the same way as sum generator 42 described above.

So far, the generation of the actual sum bits has been described. With reference to FIG. 1, the generation of the actual carry bits will now be described. As previously mentioned, the dummy carry signals C(0) and CN(0) from the first signal generator 10 are sent to the first dummy select chain 20 and the dummy carry signals C(1) and CN(1) from the first signal generator 10 are sent to the second dummy select chain 30. In addition to serving as inputs to the sum selectors, these carry signals are sent to carry selectors 22B and 22C of the first dummy select chain 20, and to carry selectors 32B and 32C of the second dummy select chain 30, respectively. Similarly to the sum selectors, the carry selectors pass the appropriate carry inputs depending upon the state of the carry signals from the preceding member of the respective dummy select chain.

Figure 3:
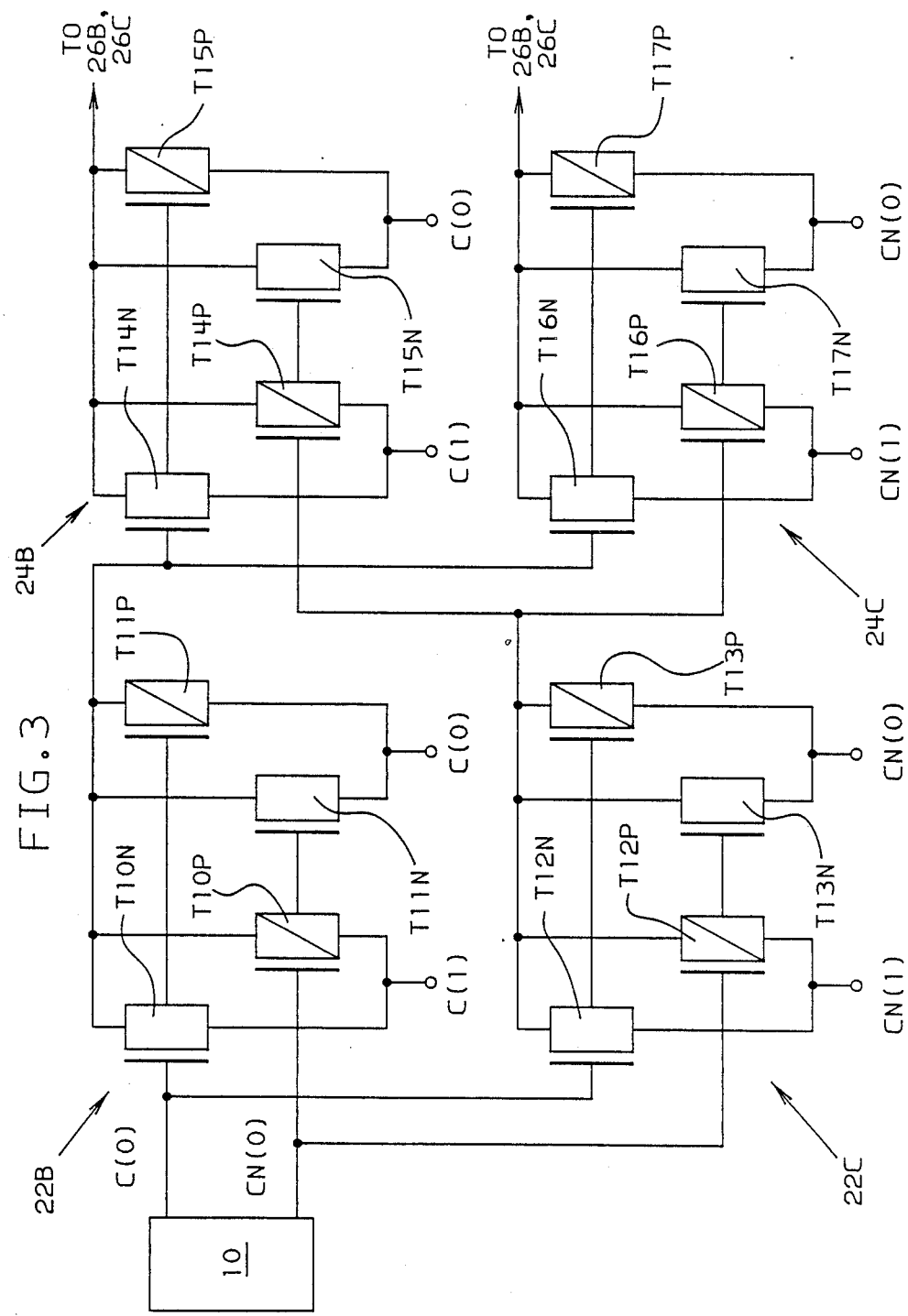
FIG. 3 is a schematic circuit diagram of circuit blocks 22B, 22C, 24B, and 24C of FIG. 1.

With reference to FIG. 3, the operation of the carry select blocks of the dummy select chain will now be described. FIG. 3 show the detailed implementation of carry select members 22B, 22C, 24B, and 24C. Note that each member is made up of two pairs of N and P pass devices, as were the dummy sum selectors and the sum generators. Carry select 22B has a N device T10N with its gate coupled to dummy carry input C(0) from signal generator 10, and a P device T10P with its gate coupled to dummy carry input CN(0). Both devices are coupled to dummy carry input C(1) from signal generator 12. Likewise, the gate of T11N is coupled to CN(0) from signal generator 10, and the gate of T11P is coupled to C(0) from signal generator 10. Both devices are coupled to dummy carry input C(0) from data generator 12. In operation, if C(0) from generator 10 is high, CN(0) is low, such that devices T10N and T10P are on, and T11N and T11P are off. Thus, carry generator 22B passes carry input C(1) from the signal generator 12. Similarly, if C(0) is high, devices T12N and T12P will be on, and devices T13N and T13P will be off, such that carry generator 22C passes carry input CN(1) from signal generator 12. These signals (C(1) from 22B, CN(1) from 22C) form the carry inputs to the next set of carry generators 24B, 24C in the first dummy select chain.

Carry selects 24B, 24C operate similarly to carry selects 22B, 22C. If C(1) from 22B is high, devices T14N and T14P will be on, passing carry input C(1) from signal generator 14. If C(1) is high, CN(1) is low, such that devices T16N, T16P will be on, passing carry input CN(1) from signal generator 14. These signals now form the carry inputs to the next members 26A, 26B of the first dummy select chain 20. With reference to FIG. 1, note that the outputs of 26A, 26B are inverted via inverters I26A, I26B, respectively. Note that these inverters are not necessary for functionality per se; they will be discussed in more detail later. The second dummy select chain 30 operates in a manner similar to that of the first dummy select chain 20. That is, members 32B, 32C have a structure and operation that is the same as members 22B, 22C, with the exception that the dummy carry inputs from the least significant bit pair are the CN(1), C(1) signals from generator 10. Similarly, carry selects 34A, 34B and 36A, 36B operate the same way.

Figure 4:
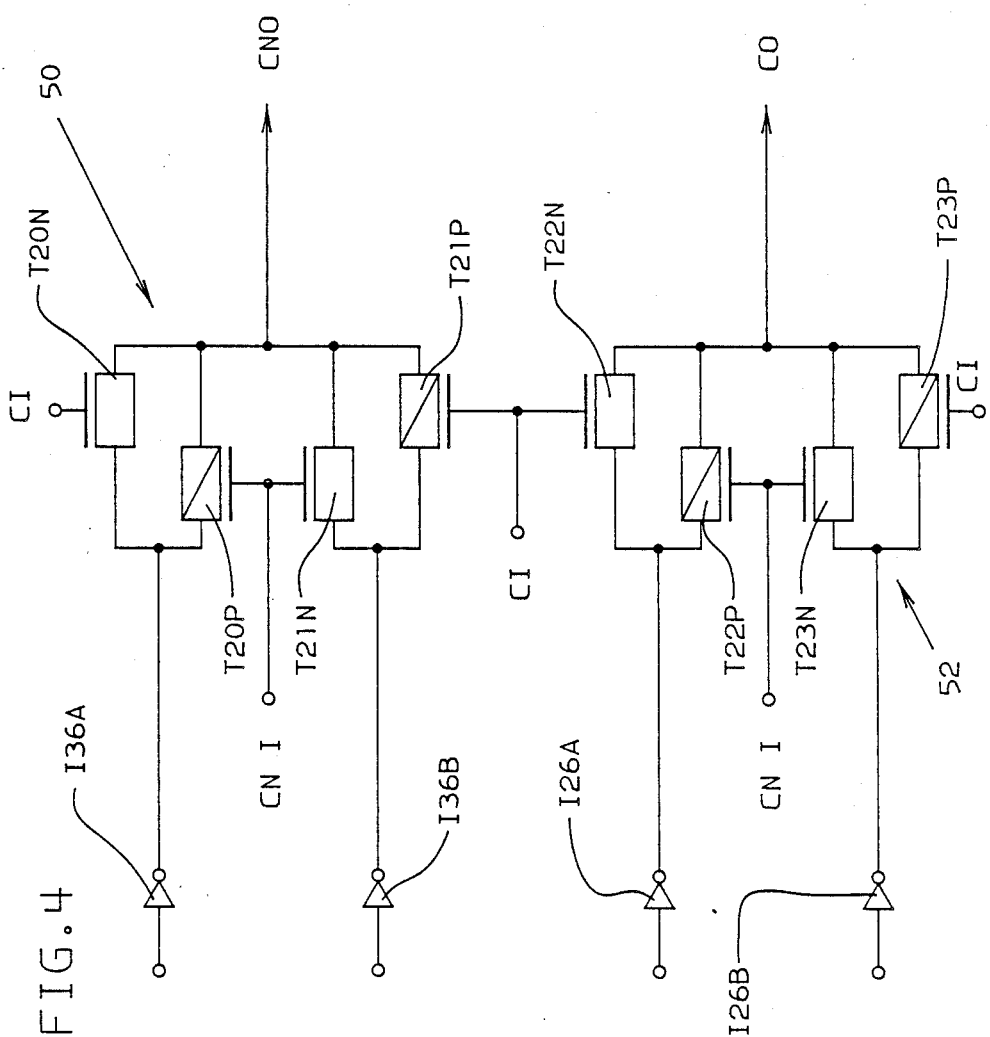
FIG. 4 is a schematic circuit diagram of circuit blocks 50 and 52 of FIG. 1.

Thus, in the invention two dummy select chains are utilized, one for each set of carry select signals from the signal generator for the least significant bit pair. The selects are referred to as "chains" in that the carries selected by one member of the chain provides the control input to the next member of the chain. At the end of the chain (i.e. at the output of inverters I26A, I26B, I36A, and I36B), the resulting dummy carries represent the dummy carry out signals for an an initial carry-in accompanying the least significant bit of either polarity. Similarly to the sum generation operation described previously, the final carry out signals are generated by carry generators 50 and 52. The generators receive the dummy carries from the ends of both dummy select chains via inverters I36A, I36B, I26A, and I26B. With reference to FIG. 4, generators 50 and 52 operate the same way as the sum generators. If the original carry-in CI is low, the CNI signal will be high, such that devices T20N, T20P, T22N, and T22P will be off, and devices T21N, T21P, T23N, and T23P will be on. Thus the dummy carry signal from inverter I36B will be selected as the real carry-out CNO, and the dummy carry signal from inverter I26B will be selected as the real carry-out C0.

With reference to FIG. 1, note that the carry generators 50, 52 receive the CI, CNI inputs separately from the data selectors. Since the number of data selectors varies with the number of bits to be added, the load on the lines carrying the CI, CIN inputs to the data selectors can be quite high. This may tend to slow down the operation of the adder, since it takes longer to drive a more heavily loaded line rail-to-rail.

The significance of this feature of the invention will become more clear upon a discussion of the second embodiment of the invention as illustrated in FIG. 5. In FIG. 5, two eight-bit words are to be added together. Thus two sets of signal generators, dummy select chains, sum generators, and carry generators are needed. The first set is for adding together the four least significant bit pairs (A0–A3 added to B0–B3). This first set has exactly the same construction as the four-bit adder of FIG. 1 (like reference numerals have been used to indicate this similarity). The second set also has the same construction as the set shown in FIG. 1, although it is shown in an abbreviated form for the purposes of clarity. Thus, the dummy sum signals SN(BP4), SN(BP5), SN(BP6), and SN(BP7) corresponding for the bit pairs A4–B4, A5–B5, A6–B6, and A7–B7, respectively, are generated by signal generators and chosen by sum selectors associated with first and second dummy select chains, as were the dummy sum signals SN(0), SN(1) previously discussed. Similarly, the dummy carry signals at the inputs to inverters I136A, I126A, I136B, I126B are generated the same way as the dummy carry signals at the inputs to I36A, I26A, I36B, I26B, respectively, as previously discussed. In FIG. 5 those circuit elements with reference numerals of three digits work in exactly the same fashion to generate the same type of signals as those elements of FIG. 1 having the same last two reference numerals. For example, the carry generator 150 of FIG. 5 provides the same function in the same way as carry generator 50.

The significance of this embodiment is its illustration of the transmission of carry signals from the end of the first set of carry select chains to the second set. Note how the outputs of the carry generators 50, 52 are taken directly to the inputs to the carry generators 150, 152, while the outputs of the inverters 50A, 50B are taken to the four data selectors 140, 142, 144, and 146. This arrangement maximizes the speed at which the final carry out signals from the previous carry generators are sent to the next set of carry generators. In addition to the previous carry generators receiving the original carry-in signals independent of the data generators as previously described, in this arrangement the carry-out signals are sent directly from the inverter inputs to the next carry generators 150, 152 to further maximize the speed of carry generation. That is, since carry generation consumes a larger share of the total processing time of the adder, this arrangement further increases processing speed. At the same time, inverters 50A, 50B (as well as inverters I36A, I36B, I26A, I26B) are utilized to buffer the carry signals so there is no signal degradation through the next group of carry generators.

As described herein, the invention provides a adder or signal generator in which two operands can be efficiently processed with a minimum of delay due to waiting for carry generation. By utilizing efficient logic generation techniques, a set of dummy sum and carry signals are generated that are all a function of the state of the carry-in to the least significant bit pair. These logic techniques include the use of NAND-NOR logic to generate the initial dummy signals, the use of N and P transmission gates to minimize threshold losses, and (most importantly) the use of double dummy select chains to efficiently select the appropriate dummy sum and carry signals. By transmitting the carry-in to the data selectors and the carry generators separately, and transmitting the result of the carry generators directly to the inputs to the next carry generators without buffering, the carrys are generated in an efficient manner.

It is to be understood that various modifications can be made to the specific structures and general teachings rendered above without departing from the spirit and scope of the present invention. For example, in FIG. 4 and eight-bit adder is shown in which two groups of four bit pairs are logically combined. In practice the relative groups can be of any size or number (e.g., one eight bit group, one six bit group and one two bit group, four two-bit groups, etc.). As previously stated, although the invention has been described relative to an adder, it can be used in conjunction with any logic function in which carry and sum bits are derived. Moreover, the logic utilized in the invention can handle either positive or negative logic pulses. Finally, in situations in which threshold losses can be tolerated and/or signal generation speed requirements are not as rigid, N and P transmission devices and/or NAND/NOR logic, respectively, may be deleted and alternatives (e.g., N transmission devices only, AND/OR logic, dynamic logic featuring node discharge) may be utilized, so long as the functions and general signal generation methodologies described herein are preserved.

What is claimed is:

1. A logic synthesis network for combining repsective bit pairs of first and second operands, including at least a least significant bit pair and a most significant bit pair, so as to generate a sum bit for each respective bit pair and carry-out bits to accompany the sum bit for the most significant bit pair, the least significant bit pair including carry-in bits, comprising:

a first means for generating a plurality of dummy sum and dummy carry signals for all of the respective bit pairs at substantially the same time;

a first dummy select chain for serially selecting between said dummy sum and carry signals from said first means for each bit pair other than said least significant bit pair, in accordance with first dummy carry signals generated by said first means for said least significant bit pair;

a second dummy select chain for serially selecting between said dummy sum and carry signals from said first means for each bit pair other than said least significant bit pair, in accordance with second dummy carry signals generated by said first means for said least significant bit pair;

a second means for selecting between said dummy sum signals from said first and second dummy select chains for each bit pair other than said least significant bit pair and selecting between said dummy sum signals generated by said first means for said least significant bit pair, at substantially the same time, and providing the selected signal as the sum bit for the respective bit pair, said second means being controlled by the carry-in bits of the least significant bit pair; and a third means for selecting between the dummy carry signals from the first and second dummy select chains and providing the selected signals as the carry-out bits accompanying the most significant bit pair, said third means being controlled by the carry-in bits of the least significant bit pair.

2. The logic synthesis network as recited in claim 1, wherein each of said first and second carry select chains comprise a plurality of transmission gates.

3. The logic synthesis network as recited in claim 2, wherein each of said plurality of transmission gates comprise N and P devices.

4. The logic synthesis network as recited in claim 2, wherein said first means is comprised of NAND-NOR logic gates.

5. A logic synthesis network for combining respective bit pairs of first and second operands, including at least a least significant bit pair and a most significant bit pair, so as to generate a sum bit for each respective bit pair and carry-out bits for the most significant bit pair, the least significant bit pair including carry-in bits, comprising:

a first means for generating first and second dummy sum signals, and first and second pairs of dummy carry signals, for all of the respective bit pairs at substantially the same time;

a first dummy select chain comprising a plurality of members, each of which selects one of said first and second dummy sum signals and one of said first and second pairs of dummy carry signals from said first means for each respective bit pair other than the least significant bit pair, as a function of the first pair of dummy carry signals from said first means for the least significant bit pair, the selected pair of dummy carry signals from a given member of said first dummy select chain providing a control input to the next member;

a second dummy select chain comprising a plurality of members, each of which selects the other of said first and second dummy sum signals and the other of said first and second pairs of dummy carry signals from said first means for each respective bit pair other than the least significant bit pair, as a function of the second pair of dummy carry signals from said first means for the least significant bit pair, the selected pair of dummy carry signals from a given member of said second dummy select chain providing a control input to the next member;

a second means for selecting between said first and second dummy sum signals from said first and second dummy select chains to produce the sum bit for each bit pair at substantially the same time, the second means being controlled by the carry-in bits of the least significant bit pair; and a third means receiving the selected pairs of dummy carry signals from each of the first and second dummy select chains and selecting between said pairs to produce the carry-out bits for the sum bit for the most significant bit pair, the third means being controlled by the carry-in bits of the least significant bit pair.

6. The logic synthesis network as recited in claim 5, wherein the first means comprises a plurality of circuit blocks, each of said blocks receiving one of said respective bit pairs as an input.

7. The logic synthesis network as recited in claim 6, wherein each of said logic blocks comprise:

a first NAND gate receiving said respective bit pair as inputs;

a first NOR gate receiving said respective bit pair as inputs; and a second NOR gate receiving the output of said first NOR gate and the inverse of the output of said first NAND gate as inputs.

8. The logic synthesis network as recited in claim 7, wherein said first NAND gate provides the first pair of dummy carry signals, said first NOR gate provides the second pair of dummy carry signals, and said second NOR gate provides said first and second dummy sum signals.

9. The logic synthesis network as recited in claim 5, wherein said first and second dummy sum and carry chains comprise a plurality of transmission gates.

10. The logic synthesis network as recited in claim 9, wherein each of said plurality of transmission gates comprise parallel N and P devices.

11. The logic synthesis network as recited in claim 5, wherein said second means comprises a plurality of transmission gates.

12. The logic synthesis network as recited in claim 11, wherein each of said transmission gates comprise parallel N and P devices.

13. The logic synthesis network as recited in claim 5, wherein said third means comprises a plurality of transmission gates.

14. The logic synthesis network as recited in claim 13, wherein each of said transmission gates comprise parallel N and P devices.

* * * * *